US011878404B2

(12) United States Patent
Diaz

(10) Patent No.: US 11,878,404 B2
(45) Date of Patent: Jan. 23, 2024

(54) DOOR PAINTING STAND SYSTEM AND METHOD

(71) Applicant: Hiram Diaz, Orlando, FL (US)

(72) Inventor: Hiram Diaz, Orlando, FL (US)

(*) Notice: Subject to any disclaimer, the term of this patent is extended or adjusted under 35 U.S.C. 154(b) by 215 days.

(21) Appl. No.: 17/687,153

(22) Filed: Mar. 4, 2022

(65) Prior Publication Data

US 2022/0288767 A1 Sep. 15, 2022

Related U.S. Application Data

(60) Provisional application No. 63/161,079, filed on Mar. 15, 2021.

(51) Int. Cl.
*B25H 1/00* (2006.01)
*B05B 13/02* (2006.01)

(52) U.S. Cl.
CPC ........ *B25H 1/0042* (2013.01); *B05B 13/0285* (2013.01)

(58) Field of Classification Search
CPC .............. B05B 13/0285; B25H 1/0042; B25H 1/0021; B25H 1/0064; F16M 11/06; F16M 11/10; Y10S 269/905
See application file for complete search history.

(56) References Cited

U.S. PATENT DOCUMENTS 4,491,308 A * 1/1985 Walton .................... B23Q 3/10 269/70
6,090,204 A * 7/2000 Speed ................ B05B 13/0285 118/500

* cited by examiner

*Primary Examiner* — Tyrone V Hall, Jr.
(74) *Attorney, Agent, or Firm* — Luis Figarella

(57) ABSTRACT

An apparatus, system and method to assist in the painting of doors, specifically for a compact rack for door painting that holds one or more doors by attaching a strip end to the top and bottom edges of one or more doors, then mounting these to end arms on stands that allow the clear and easy rotation of said door(s), followed by the stacking of the doors for drying.

6 Claims, 14 Drawing Sheets

DOOR PAINTING STAND SYSTEM AND METHOD

CROSS-REFERENCE TO RELATED APPLICATIONS

This application claims priority to U.S. Provisional patent application Ser. No. 63/161,079 titled "Door Painting Stand System and Method", filed on Mar. 15, 2021, the disclosure of which is herein incorporated by reference in their entirety.

PATENTS CITED

The following documents and references are incorporated by reference in their entirety, Edgerton (U.S. Pat. No. 6,641,668), Curra (U.S. Pat. No. 6,338,758), Quigley ((U.S. Pat. No. 684,097), Landesman et al (U.S. Pat. No. 5,944,896), Schaerer (U.S. Pat. No. 8,066,267), Günther EP2251095, Rocha (U.S. Pat. No. 7,726,003), Navarro (U.S. Pat. No. 7,798,095), Carlilse (U.S. Pat. No. 6,702,130), Waters (U.S. Pat. Appl. No. 2011/0260384) and Klippel (U.S. Appl. Pat. No. 2007/0278363).

FIELD OF THE INVENTION

The present invention relates to an apparatus, system and method for the painting of doors, specifically for a compact rack for efficient door painting.

DESCRIPTION OF THE RELATED ART

Painting and finishing doors is time consuming labor, which typically involves activities such as sanding, painting, varnishing and drying the door. Placing the door in a vertical position during this work is problematic, particularly for shorter human beings. Sprayed paint may reach surrounding objects and debris from the floor may foul the wet paint on the door. Wet paint may run down a vertical door creating unsightly tracks. It is more difficult for a painter to work on a vertical door than on a horizontal door.

Thus, ideally doors should be held in a horizontal position while they are being painted/refinished. In addition, both sides of the door should be easily exposed to be worked on, and when painted, the wet paint should not be marred by the holding mechanism. In addition, most people professionally finishing doors do them two or more doors at a time. A problem that emerges when multiple doors are painted is that a large surface area is needed to move/store the doors while they are drying. Thus, there is a need move the recently painted doors while they dry.

Another problem facing the painter is that often he must work on doors of different sizes as when he is working on several assorted cabinets. In addition, doors may have different thicknesses and may have to be handled differently and separately. Of course, the jobs may be in different places, so there is a need to do all of the above with an easy to assemble/disassemble and transport system.

Thus what the market needs is an easy to transport door holding and painting apparatus, system and method with which to easily paint doors, while at the same time assisting in stacking the freshly painted doors for drying.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about an apparatus for painting a door comprising, two or more stands, each said stand having one or more stand arms rotationally coupled to said stand, each said stand arm having a mechanical coupling opening on each end, two or more door holding end strips, each said end strip having two or more openings for attaching to a door's bottom/top edge via one or more screws/nails, wherein each said end strip has a handle near each end, each said handle protruding from a tab that extends from said end strip, said handle being at least as high as the width of said edge strip; and wherein each said end strip tab has an opening on each end matching said end arm mechanical coupling opening, so that an end strip may be securely mechanically attached to a stand arm via the insertion of a pin or screw within each matched opening. In another aspect at least one said stand is comprised of a brake/lock stand unit. In yet another aspect both end stands are comprised of a brake lock unit and the center stand is comprised of a double armed freely rotating stand.

In one aspect, the invention is about a method for painting a door comprising providing two or more stands, each said stand having one or more stand arms rotationally coupled to said stand, each said stand arm having a mechanical coupling opening on each end, providing two or more door holding end strips, each said end strip having two or more openings for attaching to a door's bottom/top edge via one or more screws/nails, wherein each said end strip has a handle near each end, each said handle protruding from a tab that extends from said end strip, said handle being at least as high as the width of said edge strip and wherein each said end strip tab has an opening on each end matching said end arm mechanical coupling opening, so that an end strip may be securely mechanically attached to a stand arm via the insertion of a pin or screw within each matched opening. In another aspect at least one said stand is comprised of a brake/lock stand unit. In yet another aspect both end stands are comprised of a brake lock unit and the center stand is comprised of a double armed freely rotating stand.

Other features and advantages of the present invention will become apparent upon examining the following detailed description of an embodiment thereof, taken in conjunction with the attached drawings, which are provided for purposes of illustration and not of limitation.

Figure 1:
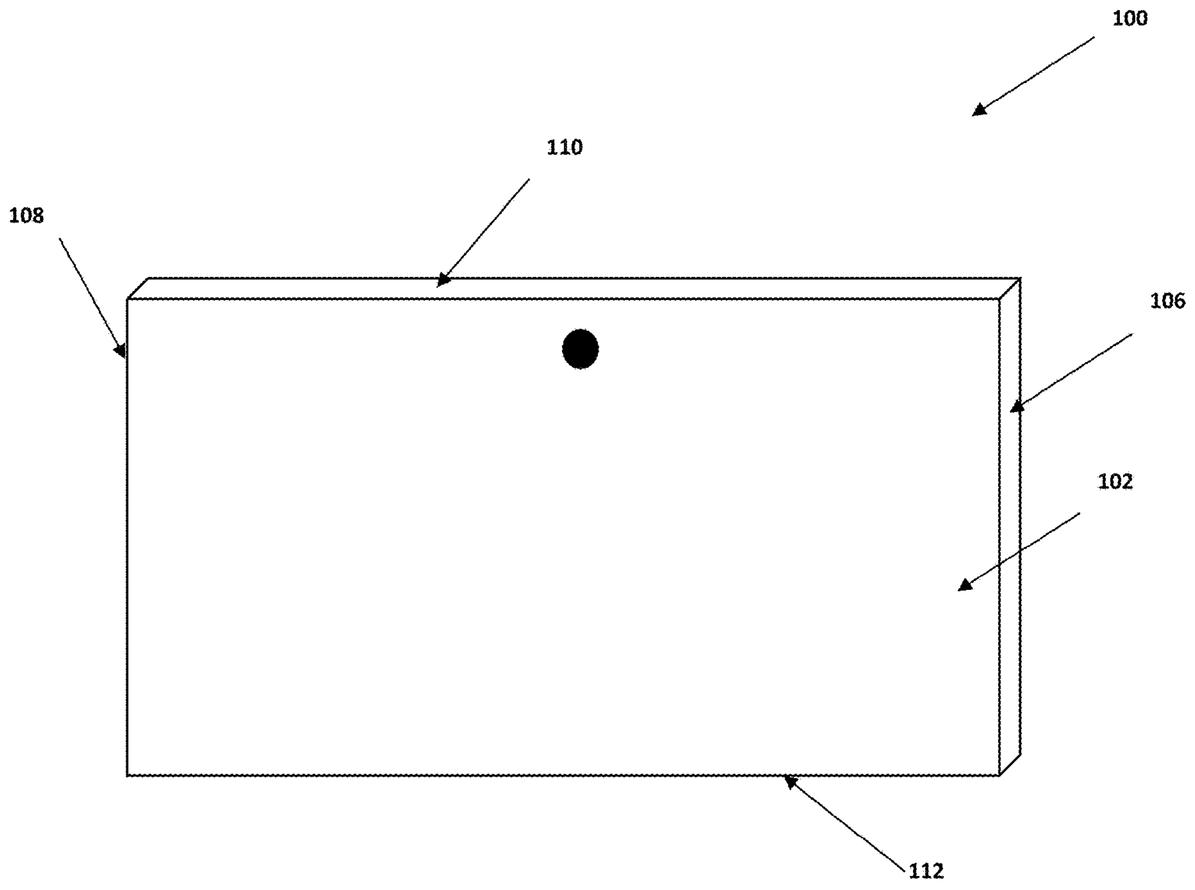
Figure 1 Prior Art
FIG. 1 shows an illustration of a door component's, according to the prior art.

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

As noted, the market needs an easier way to paint doors and similar flat surfaces, and also to transport those same surfaces after painting. Being able to stack the 'wet' (recently painted) doors, and place them where they can easily dry would be an advantage to users.

Thus what the market needs is an easy to transport door holding and painting apparatus, system and method with which to easily paint doors, while at the same time assisting in stacking the freshly painted doors for drying. Note that having the door held, particularly at an adjustable angle also allows you to also: making the openings for locks; routing the space for hinges; installing the locks/hinges; making openings to installs windows, stained glass, viewports; sanding surfaces; mold installations and/or carvings.

Figure 2:
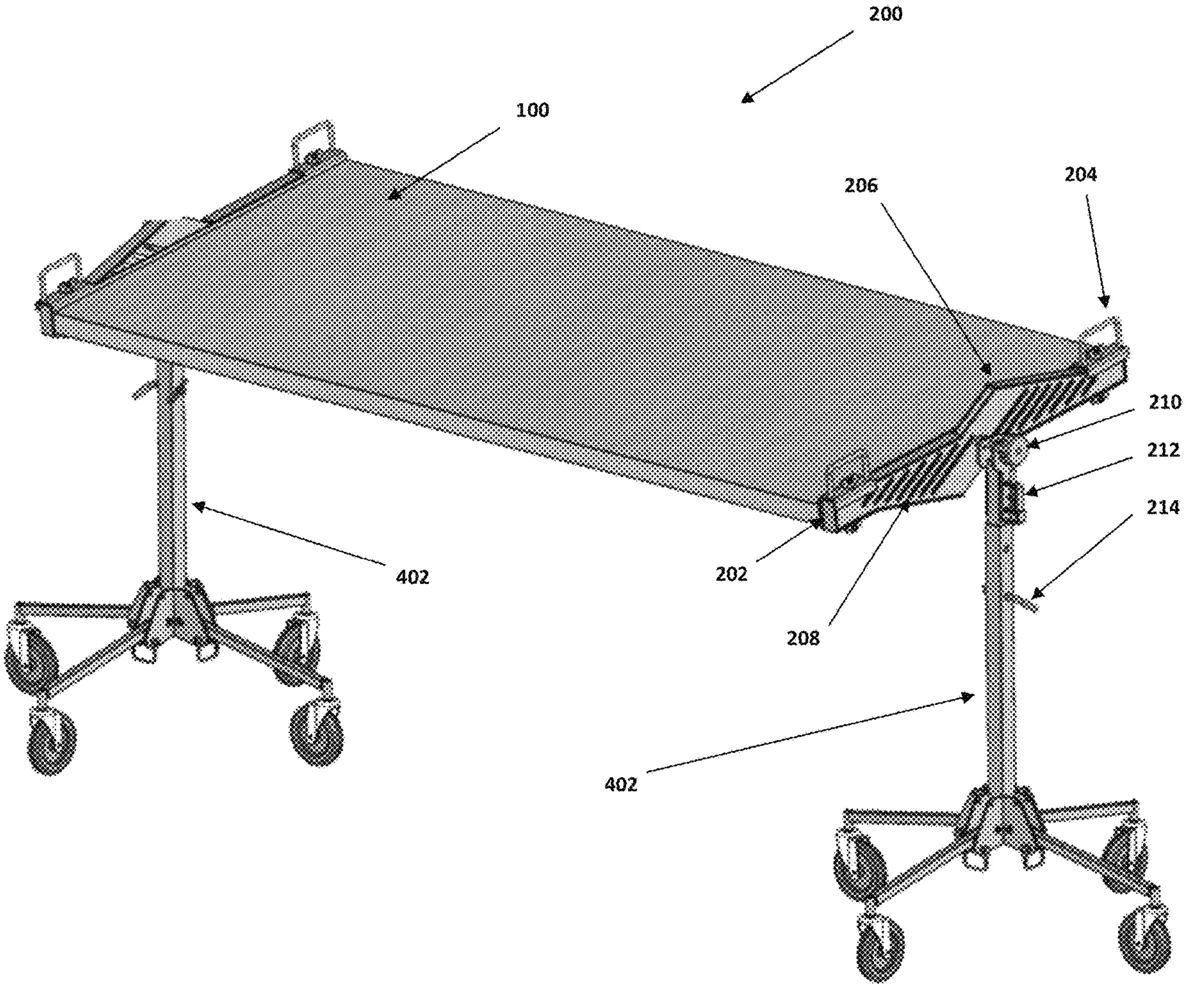
FIG. 2 shows an illustration of the proposed painting stand components, according to an exemplary embodiment of the invention.
Figure 3:
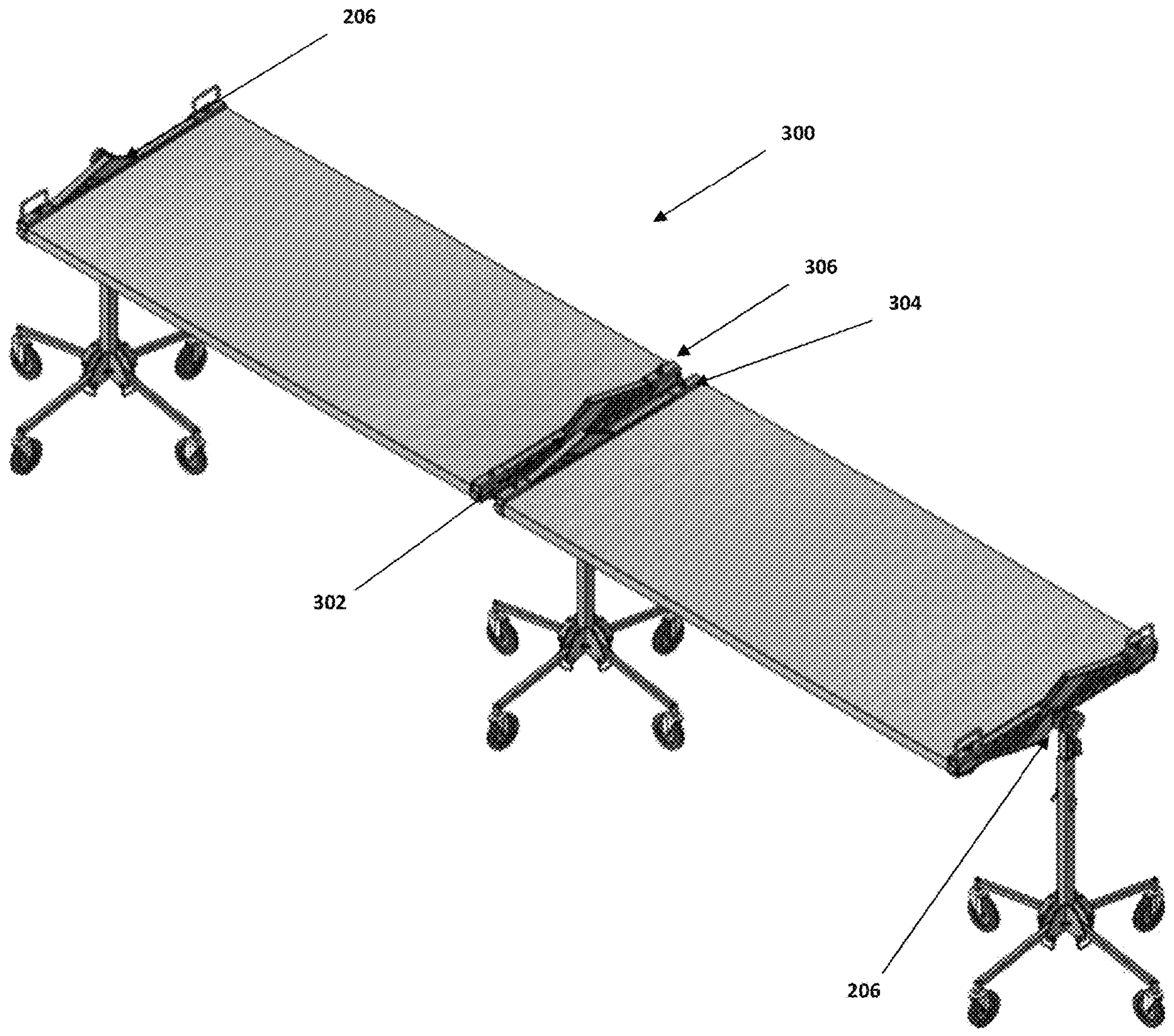
FIG. 3 shows two painting stands interconnected, according to an exemplary embodiment of the invention.
Figure 4:
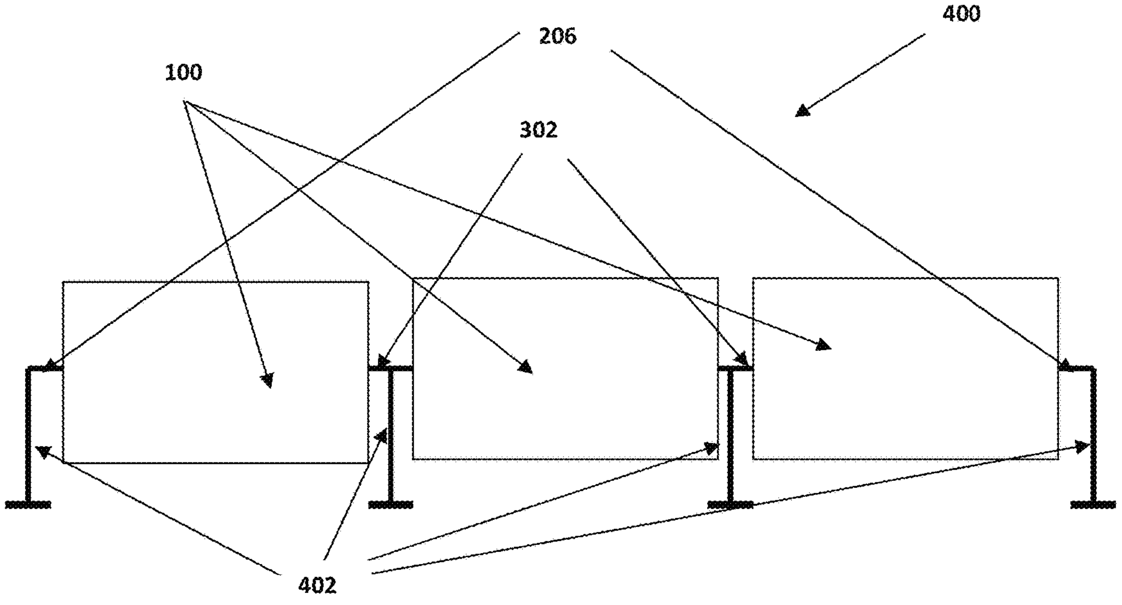
FIG. 4 shows details of three systems interconnected, according to an exemplary embodiment of the invention.

Referring to FIG. 1, we see the components/parts names of a door 100. These include the door faces (front 102 and a back opposite to it), the door top edge 106, the bottom edge 108, and the substantially parallel edges 110, 112). Referring to FIGS. 2-4, we see how the present invention provides a simple and versatile door support system 200 which holds a door 100 by attaching both the top edge 106 and bottom edge 108 surfaces of said door 100 into end strips 202. These surfaces may be pre or post painted, as they are two surfaces that are usually not visible when the door is mounted.

Figure 5:
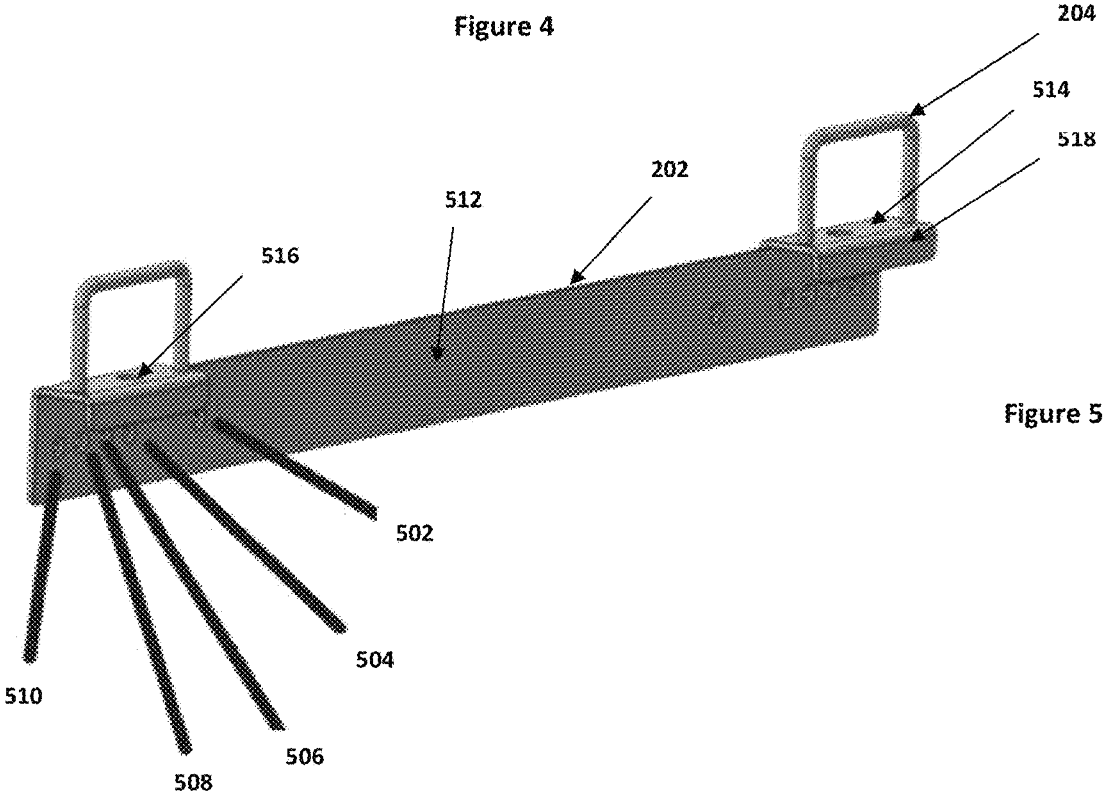
FIGS. 5, 16 show details of the end tab attachment, according to exemplary embodiments of the invention.

The system allows all four traditionally visible sides of a door (the front 102 and back faces 104 and two substantially parallel edges 110, 112) to be painted at one time, as well as with tools to safely handle the 'wet' door for drying, transport, etc. On each side 200 of the door 102, a bottom/top end strips 202, is secured to the door bottom/top edges 106, 108 via screws, nails, studs or any other kind of stiff members that are inserted into said edge 106/108 through openings 502/504/506/508/510 depending on the length of the door (FIG. 5).

In one embodiment, the end strip 202 also has one or more handles 204 for easy and safe handling of a door 100 to which it is mounted, as well as mechanical components for mounting on or near the edges of the stand arm 208.

The stand arms 208 are rotationally coupled via a rod 1402 to a stand. There may be two or more types of stands. The brake/lock stand 206 (so that the rotation of the arm 208 may be stopped whenever desired) has a lockable knob 210 and pin assembly 212 (or similar) in order to stop the position of the door 100 (mounted on one or both sides of the door via the end strips) in any desired angle. Another stand is a freely rotating stand 302 (with either a single or double 302) stand arm 208. The lockable rotating knob 210 which may be stopped at any particular position (thus varying the angle of the door) by a rotation or set pin 212. Stopping the door angle at a fixed angle assists in trimming/routing doors as well as table surfaces. Finally, the height of the stand base 402 (as well as the freely rotating one 302) may be adjusted through a height pin 214.

In one embodiment, the middle stand 302 has no knob 210 (FIG. 3), with both arms 304/306 having the same rotation rod 1402, in effect allowing for the mounting of two doors twisting next to each other 300. In another, there is a turnbuckle on top of the end unit stand 302, so that doors 100 that are side by side may independently rotate. In this fashion (FIG. 4), three of more doors 400 may be concatenated.

The stands 206/302 may be configured in many ways. In one embodiment, they are of unitary construction, in another, made of multiple segments, so that they may be assembled/disassembled for easy transport. Such an embodiment of the end unit stand 206 would have two or more vertical sections 802/804, as well as space or base that holds the leg extensions 806. It is important to point out that even with the extensions, the base has a narrower legs 806 base, not requiring the spanning of the door length, or even half of it.

In one embodiment, the end strip 202 is comprised of an elongated mechanical member intended to be placed along the bottom/top 106/108 of the door, and secured via one screw/nail opening on each side 502/504/506/508/510, so that the external side 512 of the tab 502 has the one of more handles 204. Said handles 204 have one or more mechanical coupling openings 516 in them that match the opening within the end arm 208 so as to fit pin 1302 or screw. The handle 204 protrudes from a tab 514 that extends perpendicular to the external side 512 of the end strip 202. An optional bend 518 may be added to the end of tab 514.

Figure 6:
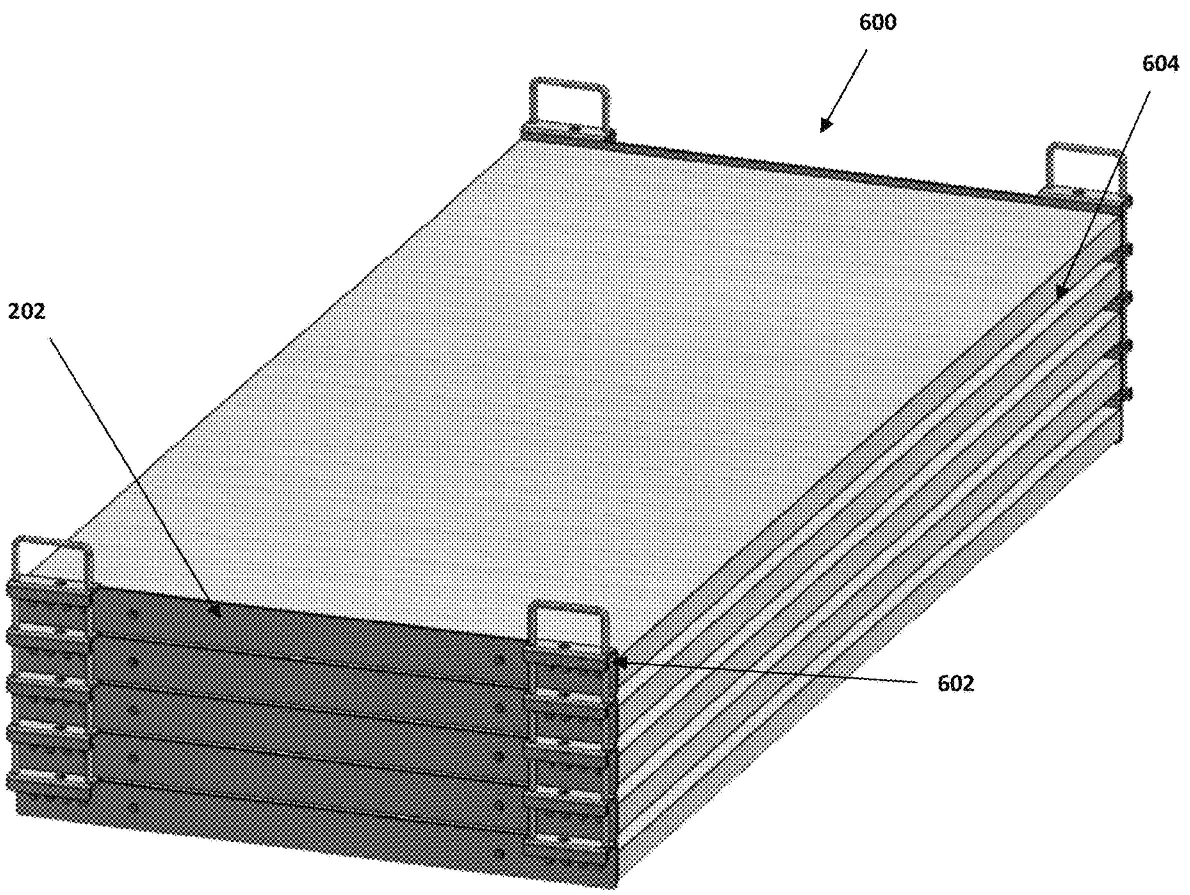
FIGS. 6-7 and 17 show stacked end tab attachments, according to exemplary embodiments of the invention.
Figure 7:
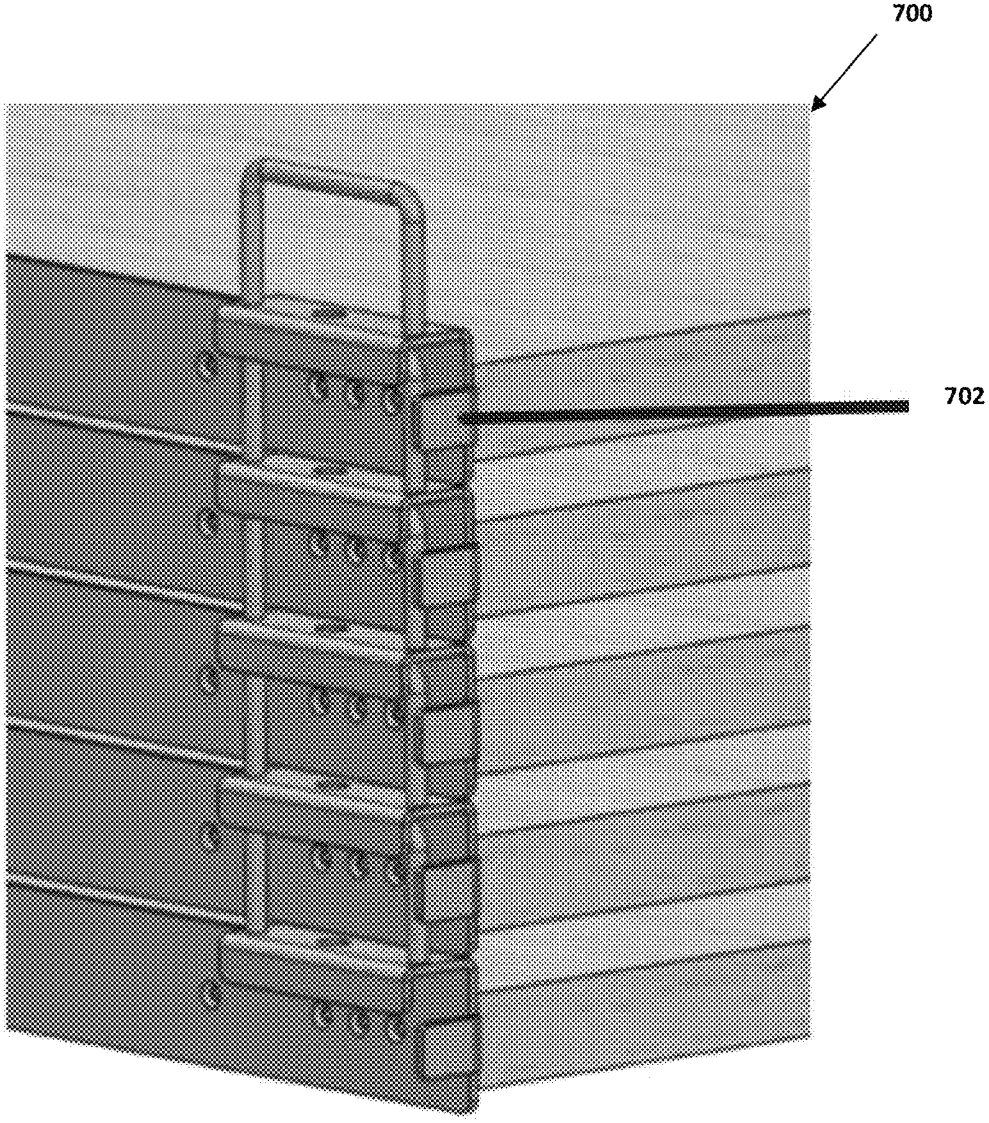
Figure 8:
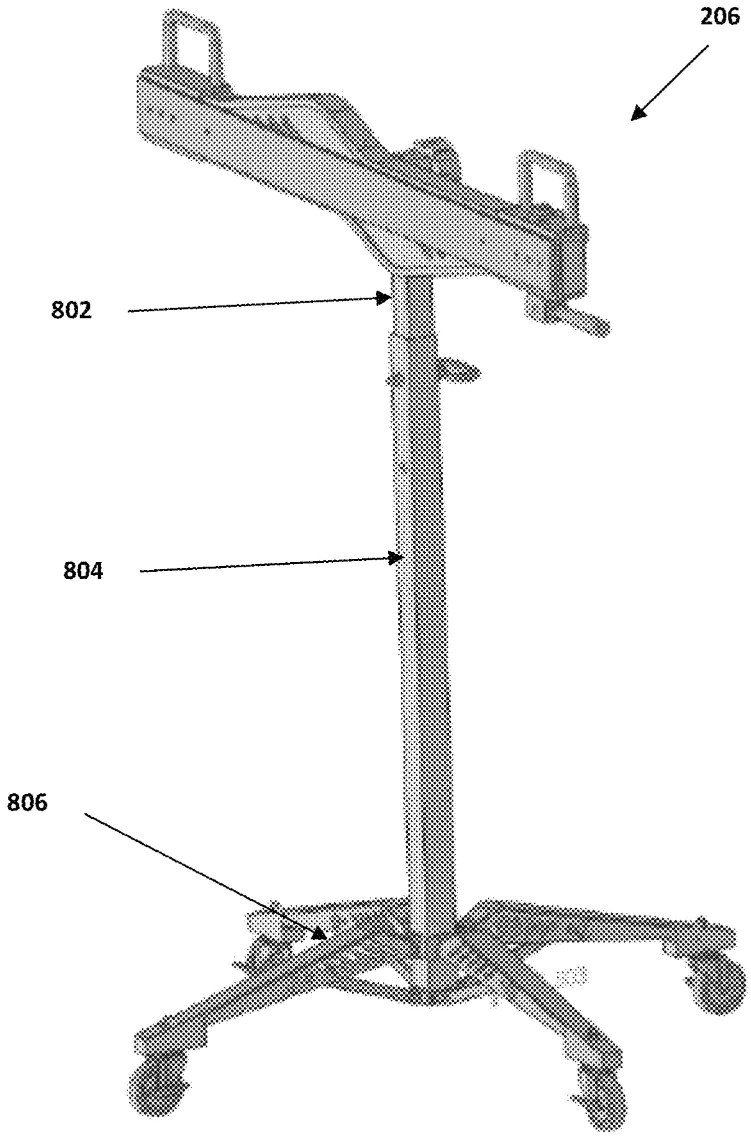
FIGS. 8-10 show views of the end unit stands, according to exemplary embodiment of the invention.
Figure 9:
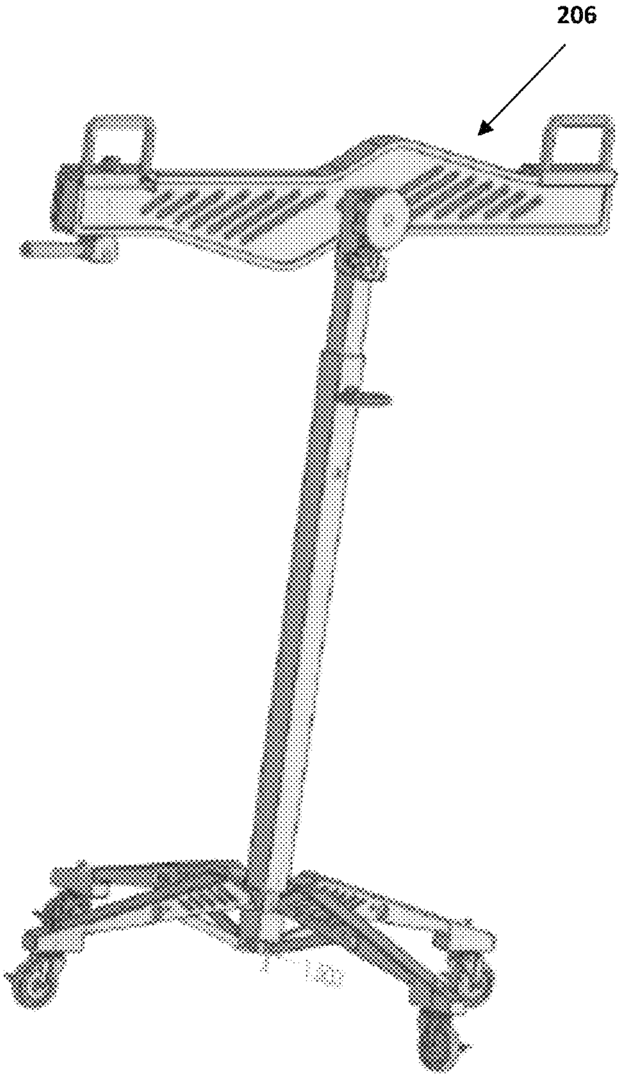
Figure 10:
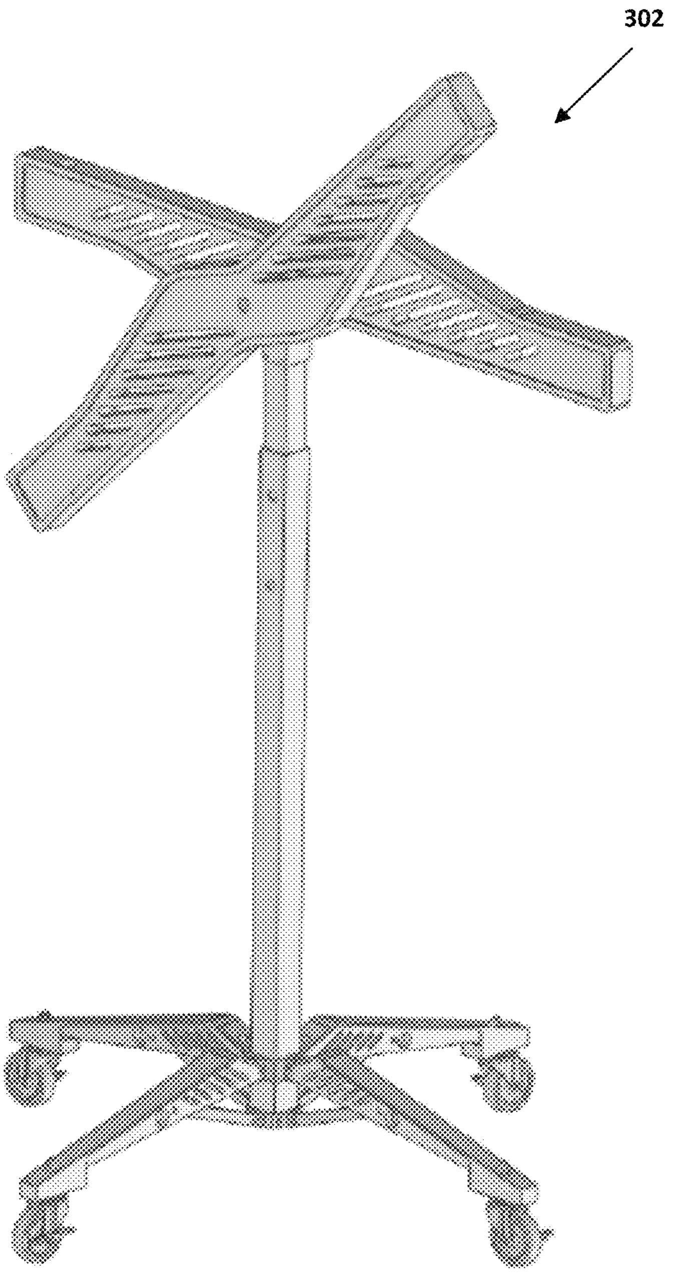
Figure 11:
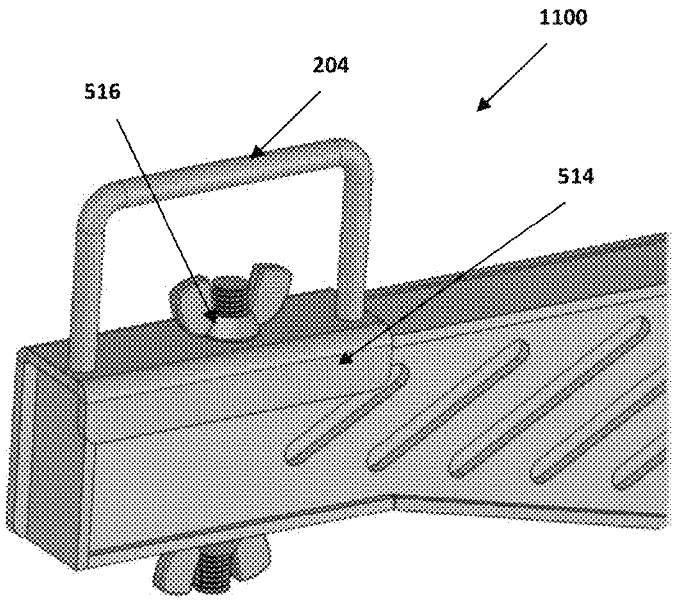
FIGS. 11-12 show the end attachment interface to the end unit stand arm, according to exemplary embodiments of the invention.
Figure 12:
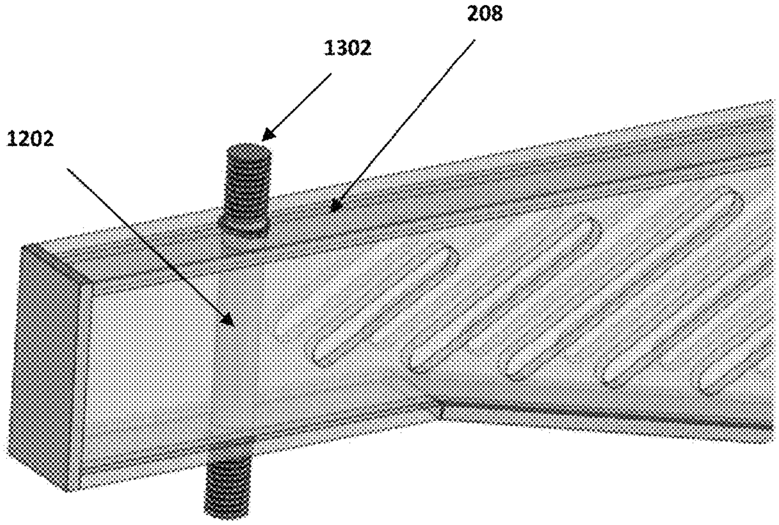
Figure 13:
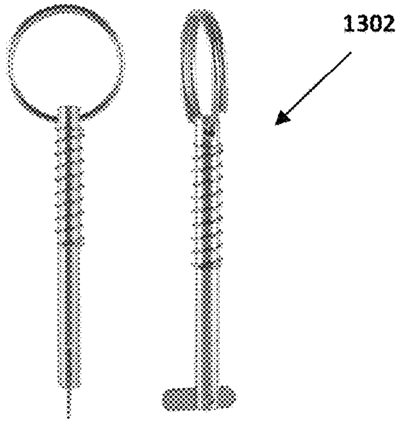
FIG. 13 shows details of the tab pin, according to an exemplary embodiment of the invention.
Figure 14:
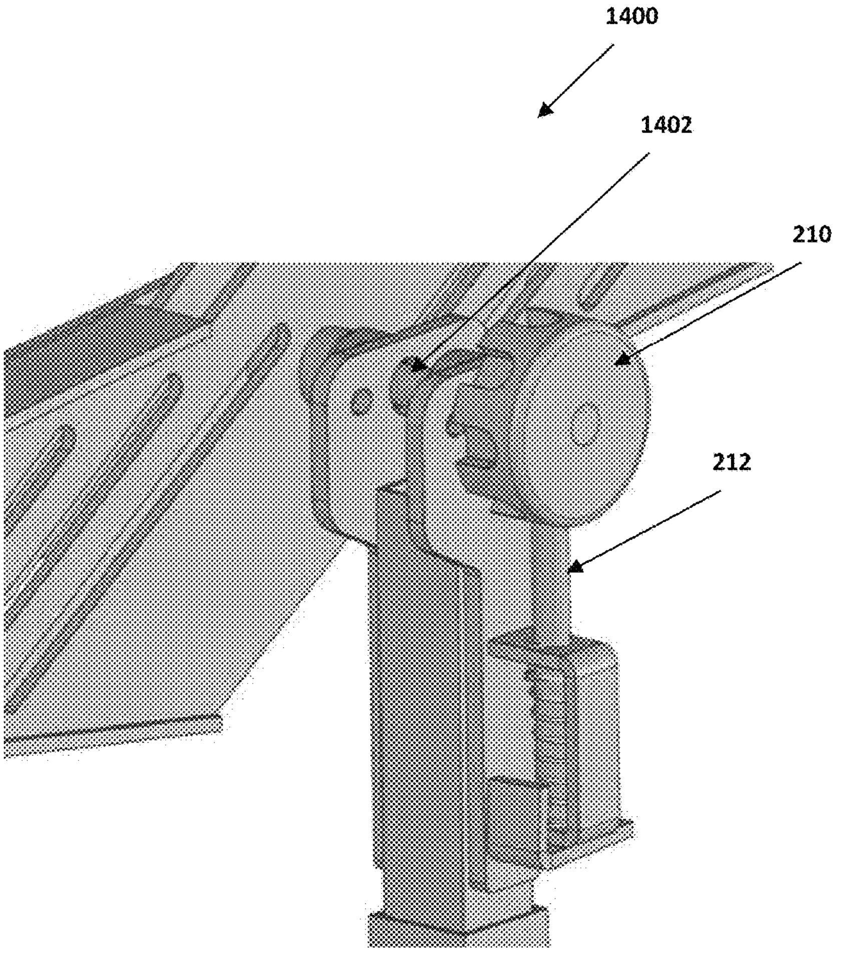
FIGS. 14-15 show door axle securing pin, according to exemplary embodiments of the invention.
Figure 15:
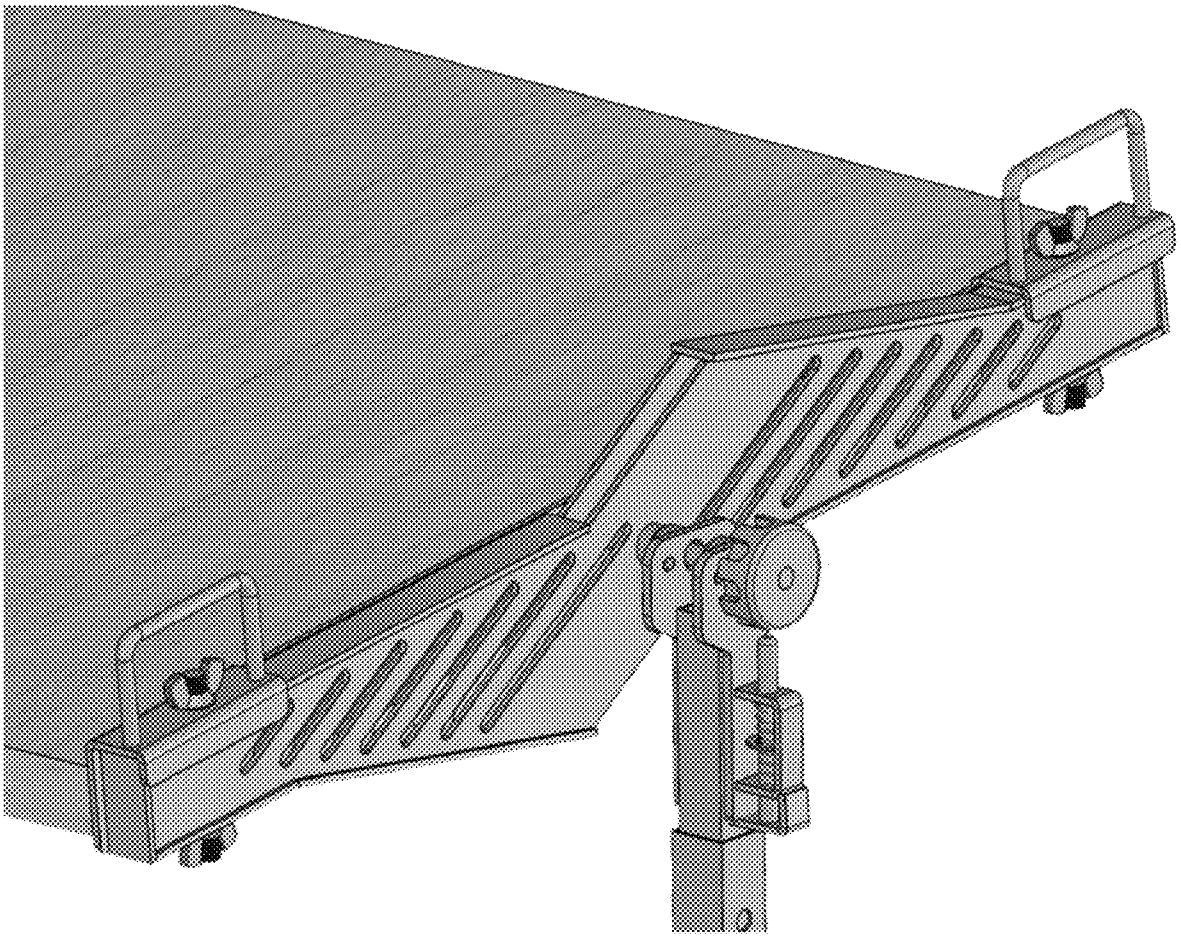
Figure 16:
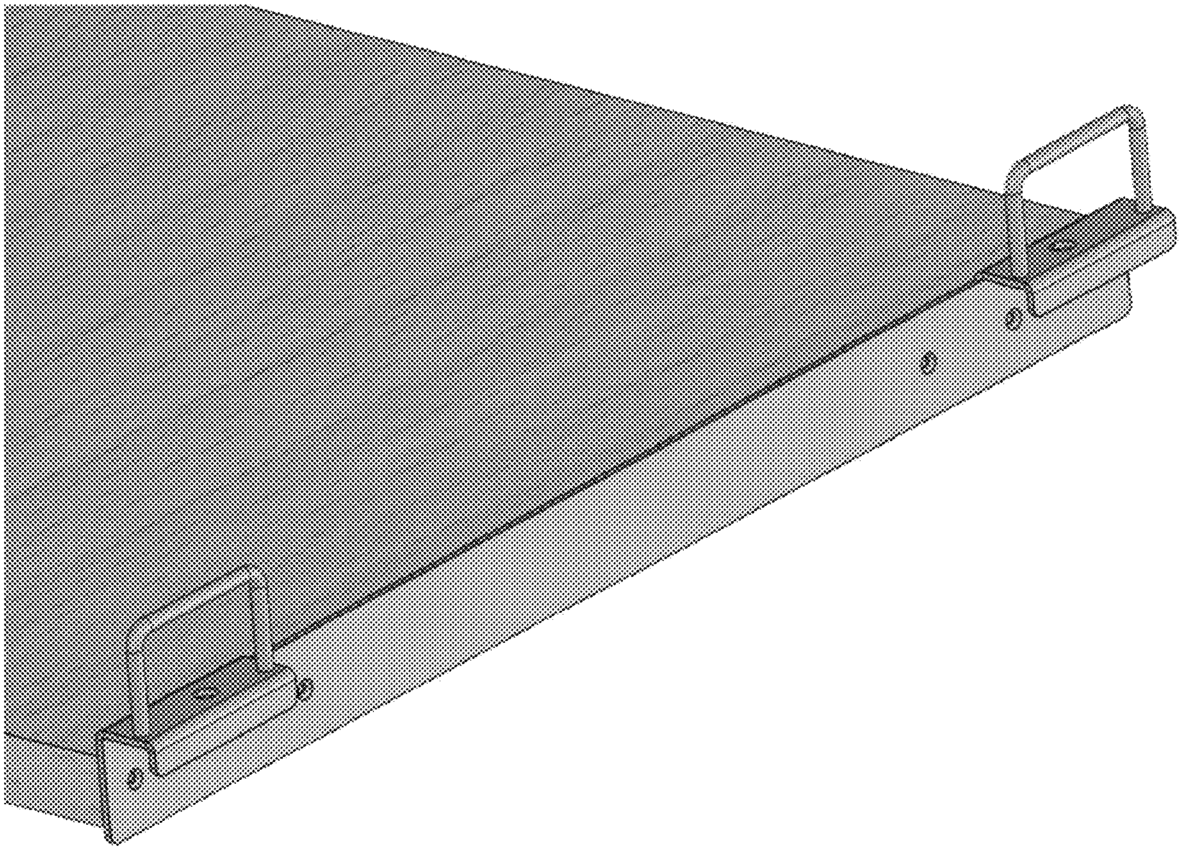
Figure 17:
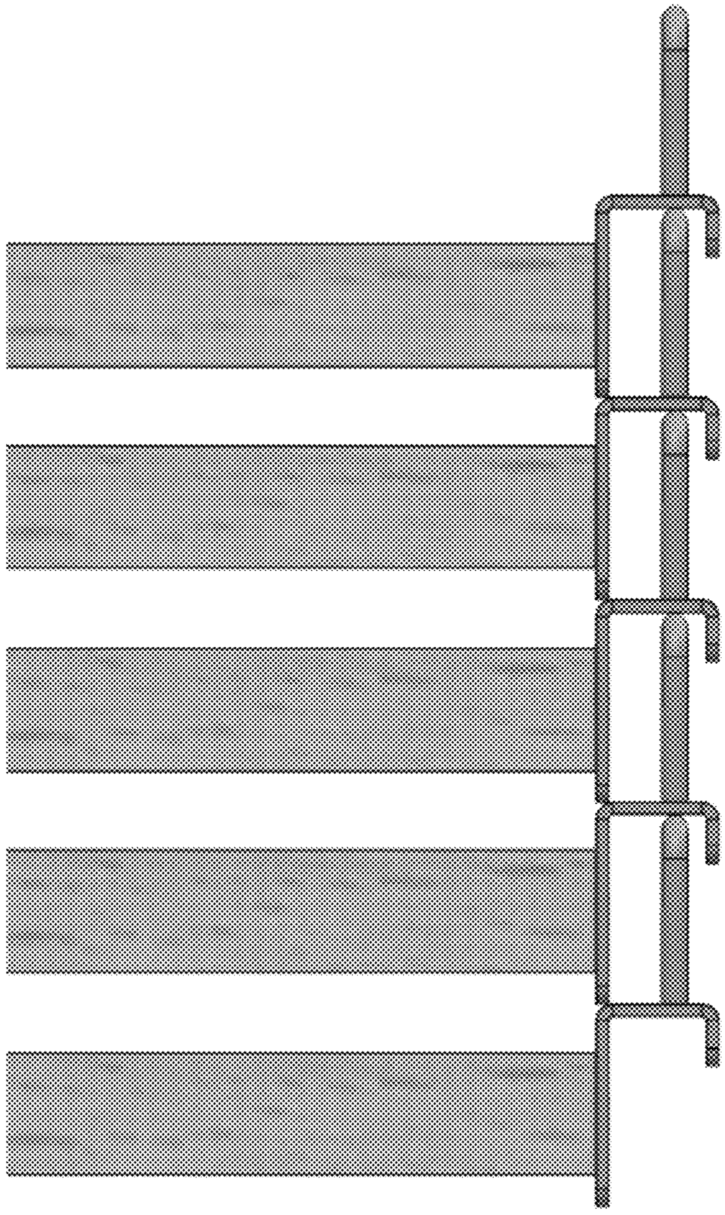

As seen 600 (FIGS. 6, 17), the handles 204 are large enough (the width of the actual end strip 202 or larger), so that when a door 100 having the strip 202 is stacked on a door below, there remains a gap 604 to allow air to pass and help in drying the paint. An optional tab 702 (FIG. 7) would aid in aligning the handles 204 from the end strip 202 below, preventing slide slips of the door stack 600.

The edges 1100 of the stand arm 208 have one or more openings 1202 that match the end tab 202 end opening 516 on the end strip 202, so that when a pin 1302, screw or similar mechanical member 1 is placed on said hole 1202, the end strip 202 is securely attached to the stand arm 208. In an alternative embodiment they may attached with twist pins or others.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. An apparatus for painting a door comprising;

two or more stands, each said stand having one or more stand arms rotationally coupled to said stand;

each said stand arm having a mechanical coupling opening on each end;

two or more door holding end strips, each said end strip having two or more openings for attaching to a door's bottom/top edge via one or more screws/nails;

wherein each said end strip has a handle near each end, each said handle protruding from a tab that extends from said end strip, said handle being at least as high as the width of said end strip; and wherein each said end strip tab has an opening on each end matching said end arm mechanical coupling opening, so that an end strip may be securely mechanically attached to a stand arm via the insertion of a pin or screw within each matched opening.

2. The apparatus of claim 1 wherein;

at least one said stand is comprised of a brake/lock stand unit.

3. The apparatus of claim 1 wherein;

both end stands are comprised of a brake lock unit; and the center stand is comprised of a double armed freely rotating stand.

4. A method for painting a door comprising;

providing two or more stands, each said stand having one or more stand arms rotationally coupled to said stand;

each said stand arm having a mechanical coupling opening on each end;

providing two or more door holding end strips, each said end strip having two or more openings for attaching to a door's bottom/top edge via one or more screws/nails;

wherein each said end strip has a handle near each end, each said handle protruding from a tab that extends from said end strip, said handle being at least as high as the width of said end strip; and wherein each said end strip tab has an opening on each end matching said end arm mechanical coupling opening, so that an end strip may be securely mechanically attached to a stand arm via the insertion of a pin or screw within each matched opening.

5. The method of claim 4 wherein;

at least one said stand is comprised of a brake/lock stand unit.

6. The method of claim 4 wherein;

both end stands are comprised of a brake lock unit; and the center stand is comprised of a double armed freely rotating stand.

* * * * *